United States Patent
Anderson et al.

(10) Patent No.: US 9,529,570 B2
(45) Date of Patent: Dec. 27, 2016

(54) RANDOM NUMBER GENERATION USING PULSED PROGRAMMING PARAMETERS

(71) Applicant: Seagate Technology LLC, Cupertino, CA (US)

(72) Inventors: William Erik Anderson, Longmont, CO (US); Monty Aaron Forehand, Loveland, CO (US)

(73) Assignee: Seagate Technology LLC, Cupertino, CA (US)

( * ) Notice: Subject to any disclaimer, the term of this patent is extended or adjusted under 35 U.S.C. 154(b) by 468 days.

(21) Appl. No.: 14/219,534

(22) Filed: Mar. 19, 2014

(65) Prior Publication Data

US 2015/0268934 A1 Sep. 24, 2015

(51) Int. Cl.
*G06F 7/58* (2006.01)

(52) U.S. Cl.
CPC .............. *G06F 7/588* (2013.01); *G06F 7/582* (2013.01)

(58) Field of Classification Search
CPC ............................................. G06F 7/58–7/588
USPC ................................................... 708/250–256
See application file for complete search history.

(56) References Cited

U.S. PATENT DOCUMENTS

| | | |
|---|---|---|
| 6,345,001 B1 | 2/2002 | Mokhlesi |
| 7,330,328 B2 | 2/2008 | Xie et al. |
| 8,495,118 B2 | 7/2013 | Wang et al. |
| 8,566,377 B2 | 10/2013 | Harris et al. |
| 8,583,711 B2 | 11/2013 | Hars |
| 2007/0271320 A1* | 11/2007 | Tsuyuzaki ............... G06F 7/588 708/251 |
| 2008/0010331 A1* | 1/2008 | Janke ...................... G06F 7/588 708/250 |
| 2012/0026784 A1* | 2/2012 | Kanai ...................... G06F 7/588 365/158 |
| 2013/0073598 A1 | 3/2013 | Jacobson et al. |
| 2014/0037086 A1* | 2/2014 | Seol ......................... G06F 7/58 380/44 |
| 2016/0124716 A1* | 5/2016 | Venkata .................... G06F 7/58 708/250 |

OTHER PUBLICATIONS

Morris Dworkin, "Recommendation for Block Cipher Modes of Operation: The CMAC Mode for Authentication," NIST Special Publication 800-38B, May 2005, 25 pps, Computer Security Division, U.S. Department of Commerce, National Institute of standards and Technology, US.

Elaine Barker & John Kelsey, "Recommendation for the Entropy Sources Used for Random Bit Generation," NIST Draft Special Publication 800-90B, Aug. 2012, 78 pps, Computer Security Division, U.S. Department of Commerce, National Institute of Standards and Technology, US.

* cited by examiner

*Primary Examiner* — Matthew Sandifer
(74) *Attorney, Agent, or Firm* — Hall Estill Attorneys at Law

(57) ABSTRACT

Apparatus and method for generating random numbers. In accordance with some embodiments, the apparatus comprises a random number generator circuit that generates a random number responsive to a total number of programming pulses used to transition a solid-state memory cell from a first programming state to a second programming state.

20 Claims, 4 Drawing Sheets

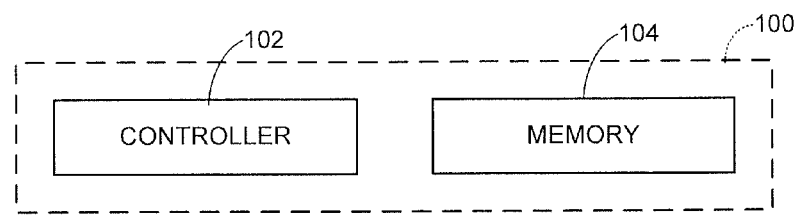
FIG. 1
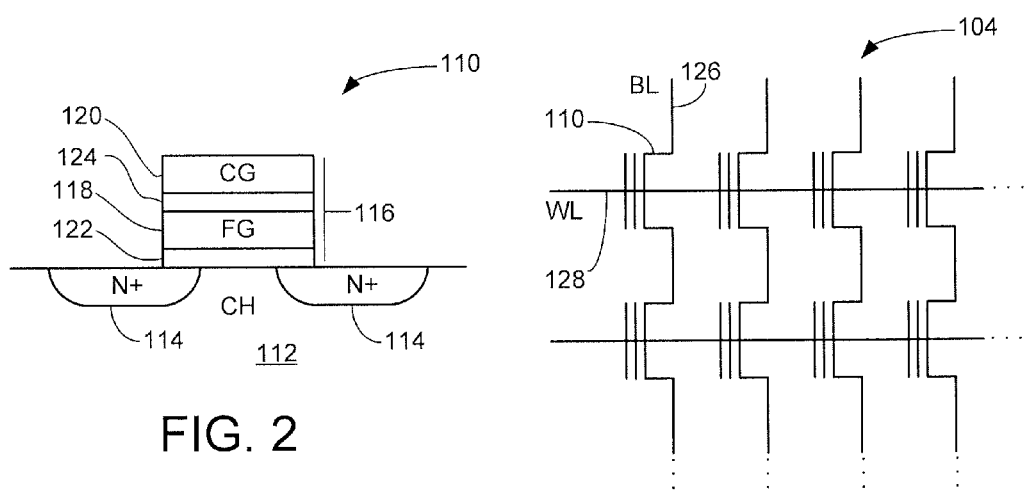
FIG. 2
FIG. 3
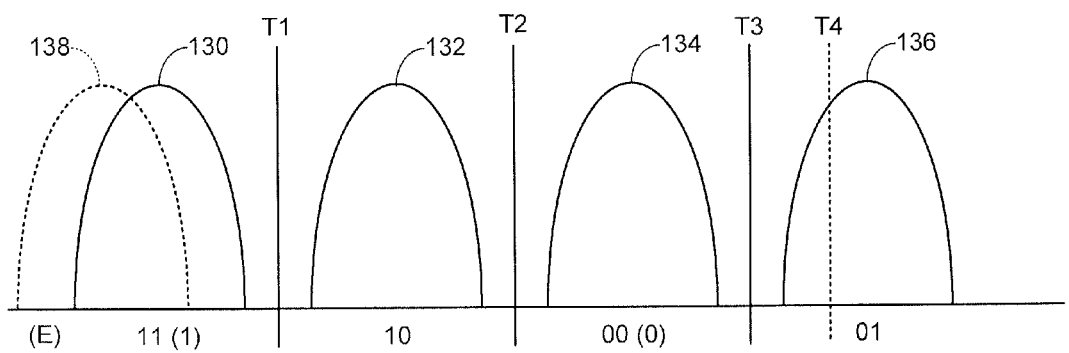
FIG. 4

RANDOM NUMBER GENERATION USING PULSED PROGRAMMING PARAMETERS

SUMMARY

Various embodiments of the present disclosure are generally directed to the generation of random numbers.

In some embodiments, the apparatus comprises a random number generator circuit that generates a random number responsive to a total number of programming pulses used to transition a solid-state memory cell from a first programming state to a second programming state.

In other embodiments, the apparatus comprises a plurality of non-volatile memory cells, and a programming circuit configured to transition the memory cells from a first programmed state to a different, second programmed state through the application of a plurality of successive programming pulses. A counter circuit accumulates a programming pulse parameter in relation to a total number of the successive program pulses applied by the programming circuit to program a selected memory cell. An extractor module generates a random number using the programming pulse parameter.

In other embodiments, the method comprises writing input data to a group of non-volatile solid-state memory cells by applying respective numbers of programming pulses thereto; accumulating a total count of the programming pulses for each of at least a portion of the cells in said group; combining the accumulated total counts of the programming pulses to form string having an entropy component; and applying an extraction function to the string to form a random number.

These and other features which characterize various embodiments of the present disclosure can be understood in view of the following detailed discussion and the accompanying drawings.

BRIEF DESCRIPTION OF THE DRAWINGS

FIG. 1 is a functional block representation of a data storage system which operates in accordance with various embodiments of the present disclosure.

FIG. 2 shows a solid-state memory cell of the data storage system of FIG. 1 characterized as a flash memory cell.

FIG. 3 shows an arrangement of the flash memory cells from FIG. 2.

FIG. 4 shows different programming states of the memory cells of FIG. 3.

DETAILED DESCRIPTION

Figure 5:
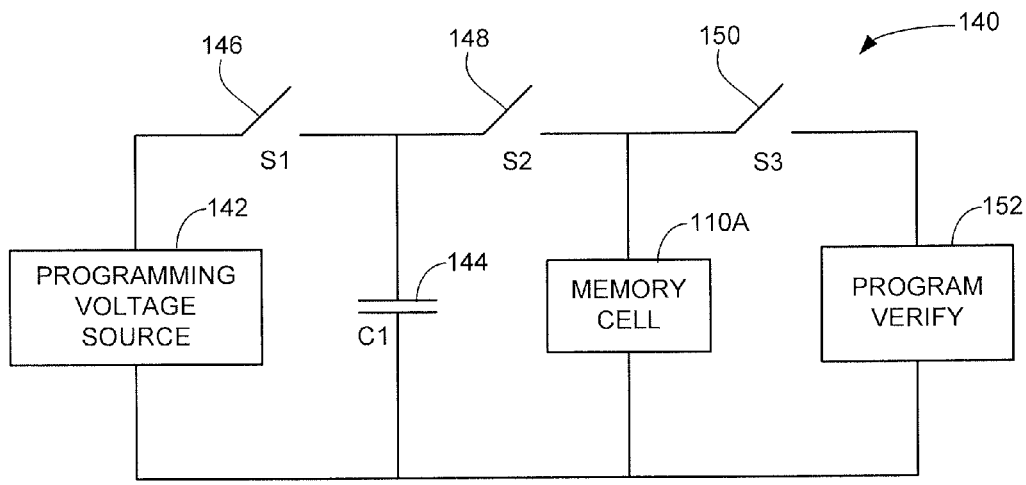
FIG. 5 is a schematic representation of a programming circuit used to program the various programming states of FIG. 4.

Data security schemes are used to reduce or eliminate unwanted access to data by unauthorized users of digital data storage systems. Data security schemes can employ a variety of cryptographic security techniques, such as data encryption and other data security protocols.

Data encryption generally involves the transformation of an input data sequence (plaintext) to an encrypted output data sequence (ciphertext) using a selected encryption algorithm (cipher). The cipher may utilize one or more pieces of auxiliary data (keys) to effect the transformation. In this context, plaintext can include data that have been previously encrypted by an upstream encryption process.

Data security protocols more generally deal with maintaining the security of data within a system, such as by establishing symmetric keys, carrying out secret sharing transactions, establishing and verifying connections, authenticating data, etc.

Data encryption schemes and other security protocols are often designed to utilize random numbers. In practice, however, the generation of truly random numbers is often technologically difficult to implement. A variety of solutions have been proposed in the art to enable memory based systems to generate random (or pseudo) random numbers for cryptographic security and other purposes. While operable, these solutions are often either lacking in the ability to generate true random numbers or require excessive computational resources.

Accordingly, various embodiments of the present disclosure are generally directed to an apparatus and method for generating random numbers. As explained below, in some embodiments a solid-state memory comprises a plurality of memory cells which are programmed using a sequence of pulses. A programming pulse parameter is identified for at least selected cells, such as the total number of programming pulses required to program each of the cells or an elapsed time required to program each of the cells based on the application of the programming pulses. It is contemplated that the programming pulse parameters will exhibit a relatively low level of entropy (variation).

The accumulated programming pulse parameters are combined to form a string having an entropy component. The string is subjected to an extraction process, such as a randomized extractor or a source specific extractor, to generate corresponding random numbers. The random numbers are thereafter utilized by the system as required, such as in the formation of cryptographic keys, seeds, random sequences or other values. The random numbers generated in accordance with this disclosure are nominally indistinguishable from true random numbers.

In some embodiments, the random number generation operation is carried out in the background during normal device operation. Total numbers of programming pulses can be accumulated in a buffer memory, and the accumulated total numbers (e.g., counts) can be concatenated to form strings with entropy components which are used to generate random numbers as needed. In other embodiments, a set of pre-generated random numbers can be generated and stored for future use.

These and other aspects of various embodiments can be understood beginning with a review of FIG. 1 which provides an exemplary data storage device 100. The data storage device 100 includes a controller 102 and a memory module 104. The controller 102 is a hardware-based or programmable processor that provides top level control of the device 100. The memory module 104 comprises non-volatile solid-state memory such as but not limited to flash memory, spin-torque transfer random access memory (STRAM), resistive random access memory (RRAM), ferromagnetic random access memory (FRAM), etc. In some cases, the functionality of the controller 102 is directly incorporated into the memory module 104.

FIG. 2 shows a flash memory cell 110 that can be incorporated into the memory module 104 of FIG. 1. The use of flash memory is merely for purposes of illustration and is not limiting.

The memory cell 110 is formed on a semiconductor substrate 112 having spaced apart n+ doped regions 114. A gate structure 116 spans the pair of adjacent doped regions so that the flash cell 110 takes a general nMOS transistor configuration. A series of adjacent flash cells can be formed in a NAND configuration with a gate structure 116 spanning each adjacent pair of doped regions 114. Alternative arrangements of the cells 110 can be used, such as but not limited to a NOR configuration.

Each gate structure 116 provides an alternating stack of electrically conductive gates 118, 120 and electrically insulative regions 122, 124. Data are stored by each cell 110 in relation to the relative amount of electrical charge stored on the lower gate 118, which is referred to as a floating gate (FG).

The FG 118 accumulates charge during a programming operation by the selected application of appropriate programming pulses to the adjacent doped (drain and source) regions 114 and the upper gate 120, referred to as a control gate (CG). These applied pulses induce the controlled migration of electrical charge from a channel (CH) portion of the semiconductor substrate 112 to the FG 118 across insulative region 122.

In an initial erased state, there will be substantially no accumulated charge on the FG 118. In this state, the cell will exhibit drain-source conductivity across the channel CH without the application of voltage to the CG 120. Once charge has been accumulated on the FG 118, the drain-source path will be non-conductive unless a sufficiently high gate control voltage is applied to the CG 120, at which point the cell becomes conductive. The programmed state of the cell 110 can be determined by observing the level of CG voltage required to allow drain-source current to pass through the cell, which generally correlates to the amount of accumulated charge on the FG 118.

A special erase operation is generally required to remove accumulated charge from the FG 118. An erasure can be carried by the application of a relatively high voltage to the CG 120 to cause migration of the charge from the FG 118 back to the channel (CH) across region 122. A different set of pulses may be applied to the cell 110 to thereafter add charge to the FG 118 during a data write operation to write a new program state to the cell.

The memory cells 110 can be arranged in the memory module 104 as an array of rows and columns of the memory cells, as depicted in FIG. 3. Each column of cells can be coupled via one or more bit lines (BL) 126. The control gates (CG) 120 of the cells 110 along each row can be interconnected via individual word lines (WL) 128. Generally, each row of memory cells (a "page") is programmed at a time. Groups of rows (pages) may be arranged into erasure blocks which constitute the smallest unit of memory that can be concurrently erased at a time. An exemplary erasure block size may be on the order of 128 pages of memory, with 8192 (8 KB) bytes per page. Other sizes and configurations can be used.

The cells 110 can be configured as single-level cells (SLCs) or multi-level cell (MLCs). An SLC flash cell stores a single bit; a normal convention is to assign the logical bit value of 1 to an erased cell (substantially no accumulated charge) and a logical bit value of 0 to a programmed cell (presence of accumulated charge). An MLC flash memory cell stores multiple bits, such as two bits. Generally, n bits can be stored using $2^n$ storage states. A normal convention is to assign a multi-bit logical value 11 to an erased cell with charge C0 (substantially no accumulated charge), and then sequentially assign multi-bit logical values 10, 00 and 01 to increasingly higher charge levels C1, C2 and C3 where $C0<C1<C2<C3$.

In some cases, a group (e.g., a page) of memory cells 110 will be programmed as SLCs so that each cell stores a single bit (0 or 1) of a first set of data. A second set of data can be subsequently written to the same group (page) of cells 110 to convert the cells to MLCs. In this way, the most significant bit (MSB) of the charge state of each MLC can represent the bits in the first set of data, and the least significant bit (LSB) of the charge state of each MLC can represent the bits in the second set of data.

FIG. 4 depicts a number of charge distributions 130, 132, 134 and 136 for program states 11, 10, 00 and 01. An erased (E) state distribution is represented at 138. The use of distributions represents the fact that the various cells will tend to store different amounts of charge for a given programming state. Such variations can arise from a variety of factors including manufacturing tolerances, operational conditions, temperature, adjacent programming effects, charge drift, age, etc. While each of the distributions 130-138 are shown to be substantially Gaussian, other shapes for the respective distributions can be observed.

An erased cell 110 will initially fall within the erased state distribution 138. SLC programming will result in the application of charge to transition the cell to either the first distribution 130 (state 1) or to the third distribution 134 (state 0). While it is common to add a small amount of charge to the cells even if the cells are programmed to state 1 (e.g., transitioned from distribution 138 to 130), in other cases no charge may be applied so that distribution 138 represents both the erased state and programmed state 1. Regardless, one of two final programming states is possible during SLC programming.

Subsequent MLC programming will result in the writing of a second set of data to the cells so that each cell stores a total of two bits (11, 10, 00 or 01). One of four final programming states is possible during MLC programming.

If the SLC program state of the cell is logical state 1 (e.g., the cell is within distribution 130) and the second set of data also provides a logical 1 at this bit location, the cell remains in distribution 130 (e.g., state 11). On the other hand, if the second set of data provides a logical 0 at this bit location, the cell is transitioned to distribution 132 (e.g., state 10).

If the SLC program state of the cell is logical state 0 (e.g., the cell is within distribution 134) and the second set of data also provides a logical 0 at this bit location, the cell remains in distribution 134 (e.g., state 00). On the other hand, if the second set of data provides a logical 1 at this bit location, the cell is transitioned to distribution 136 (e.g., state 01).

During a subsequent read operation, various read voltage thresholds represented by thresholds T1, T2 and T3 are applied to the cells to determine the charge states of the cells.

Multiple thresholds may be applied in order to determine the charge state. The MSB value of the determined state indicates the bit value for the first set of data, and the LSB value of the determined state indicates the bit value for the second set of data.

FIG. 5 represents a programming circuit 140 of the storage device 100 of FIG. 1 used to program the memory cells 110 to the respective states of FIG. 4. A selected memory cell 110A is depicted in FIG. 5, but it will be understood that suitable switching circuits and interconnections are used to enable the programming circuit 140 to program each cell in turn in a similar fashion.

The programming circuit 140 takes a charge pump configuration, although other configurations can be used. The circuit 140 includes a programming voltage source 142, a charge accumulator 144, S1-S3 switches 146, 148 and 150, and a program verify circuit 152. The programming voltage source 142 supplies an appropriate programming voltage such as +5V, +12V, etc. The charge accumulator 144 may be a capacitor (C1) or other charge accumulation element.

The switches 146-150 may take the form of power MOSFETs (metal oxide semiconductor field effect transistors) or other switching devices. The program verify circuit 152 is a read circuit which applies respective read thresholds (see e.g., T1-T3 in FIG. 4) to verify that the selected cell 110A has been programmed to the desired programming state.

During a programming operation, switch S1 is closed and switches S2 and S3 are opened to allow the programming voltage from the source 142 to be applied to the C1 capacitor 144 to accumulate charge. Thereafter, switch S1 is opened and switch S2 is closed so that the accumulated charge is transferred from the capacitor to the memory cell, resulting in an increase in the total amount of charge on the floating gate (FG 118, FIG. 2). Each transfer of charge is referred to herein as a programming pulse.

It is contemplated that several programming pulses will be required to transfer sufficient charge to the selected cell 110 to achieve the desired programming state. In some cases, a baseline number of pulses are applied, after which the program verify circuit 152 begins to evaluate the final programmed state. For example, assuming that the selected cell 110A is being programmed from distribution 134 (state 00) to distribution 136 (state 01; see FIG. 4) a sufficient number of pulses may be applied that should transition the cell to distribution 136. A threshold such as the T3 threshold can be applied to ensure that the cell is now in the 01 programming state. In some cases, the T1-T3 thresholds are used during conventional read operations, and different, higher thresholds (such as threshold T4 in FIG. 4) are used during program verify operations.

Figure 6:
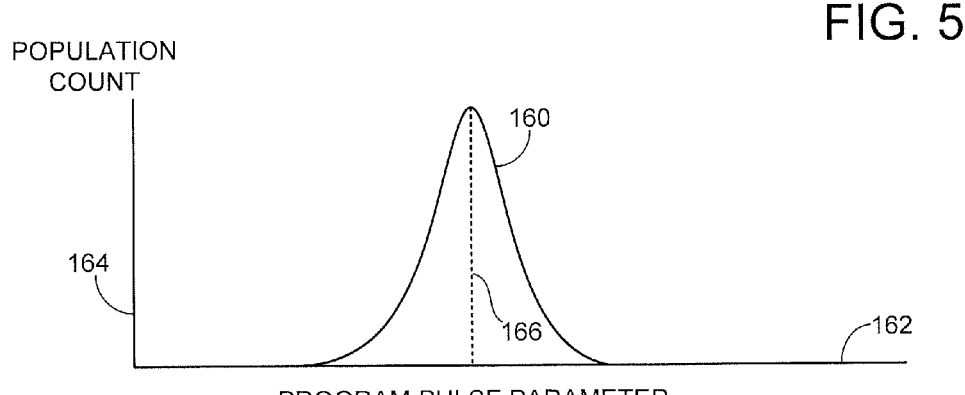
FIG. 6 is an example distribution of a selected program pulse parameter obtained by the circuit of FIG. 5.

FIG. 6 is a graphical representation of a program pulse parameter distribution curve 160. The curve 160 is plotted against a program pulse parameter x-axis 162 and a population count y-axis 164. The curve 160 is substantially Gaussian in nature, but such is merely exemplary and is not limiting. While the curve is smooth, it is contemplated that the distribution may be made up of discrete integers and may therefore take a discontinuous, step-wise shape depending on the nature of the program pulse parameter.

The program pulse parameter is associated with the programming operations carried out by the circuit 140 of FIG. 5. In some embodiments, the program pulse parameter represents the total number of pulses required to transition the cells 110 from a first MLC programming state to an adjacent second MLC state (e.g., from 00 to 01, etc.).

It can be seen that such programming operations will tend to take, on average, a certain number of pulses. In one example, many cells require a total of N pulses, such as N=15 pulses, to make the transition to the next programming state. This value is represented by the peak (midpoint) at 166. However, due to a variety of factors including temperature, age of the data, age of the cell (e.g., total number of program/erase counts), manufacturing variations, voltage supply variations, charge drift, read and write disturb effects, etc., the actual number of programming pulses required to program the individual cells represented by FIG. 6 may vary.

At this point it will be noted that the curve 160 in FIG. 6 can instead represent some other program pulse parameter, such as total elapsed time to complete the programming operation once commenced. Scheduling times are not included in the determination of FIG. 6, but such can be in another embodiment since this can be a further source of entropy in the process. The overall elapsed programming time will be a function of the total number of programming pulses applied to the respective cells to achieve the desired state. In this latter case, the midpoint 166 may represent the average programming time, with variations in both directions (e.g., some cells were programmed faster and some were programmed slower).

Figure 7:
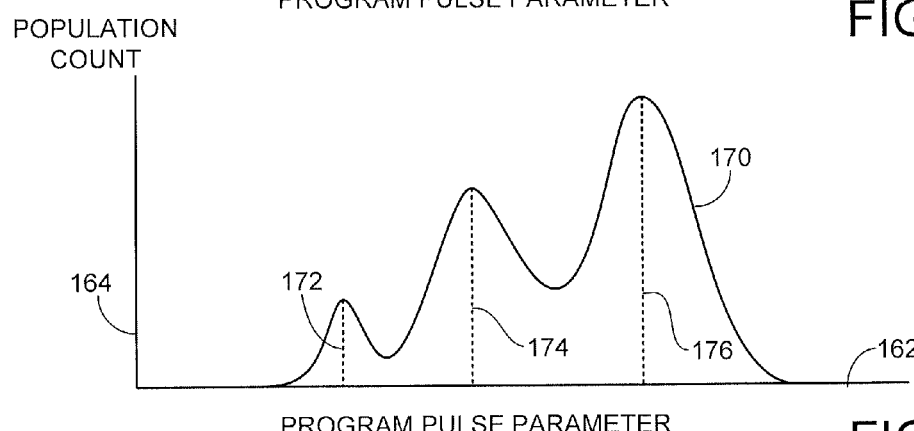
FIG. 7 is another example distribution of a selected program pulse parameter obtained by the circuit of FIG. 5.

FIG. 7 is a graphical representation of another program pulse parameter distribution curve 170. Unlike the curve 160, the curve 170 is multi-modal with peaks at 172, 174 and 176. The localized peaks 172, 174 and 176 represent localized values that may correspond to different forms of programming (e.g., from the erased state to states 0 or 1, from one MLC state to another, etc.). It will be appreciated that the actual shapes of distribution curves based on programming parameters can vary widely depending upon a variety of factors, so the example curve in FIG. 7 is just one possible type of multi-modal curve that may be obtained.

Figure 8:
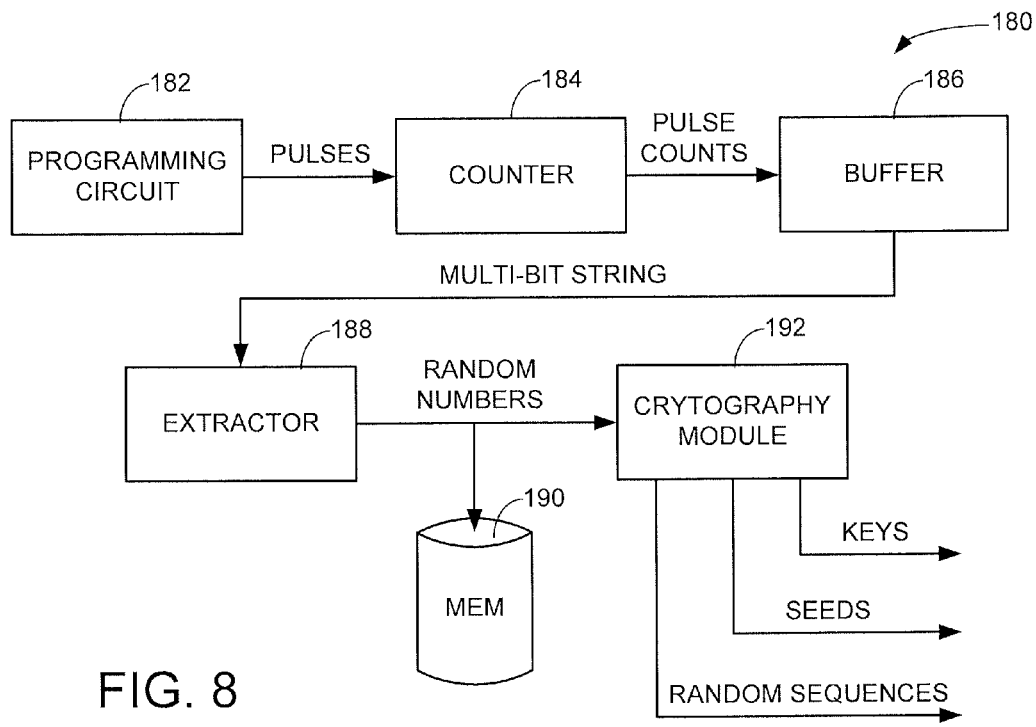
FIG. 8 is a functional block representation of the data storage device of FIG. 1 constructed and operated in accordance with some embodiments.

FIG. 8 is a functional block representation of a random number generation circuit 180 in accordance with some embodiments. The circuit 180 uses a programming circuit 182 similar to the circuit 140 in FIG. 5 to program solid-state memory cells using a successions of pulses. A counter 184 accumulates a total count of the pulses (or other programming parameter such as elapsed time, etc.) to provide pulse counts to a buffer memory 186. The buffer memory 186 can be any suitable memory adapted to store a relatively large number of the accumulated totals. It will be appreciated that the respective accumulated totals will be stored as multi-bit digital values.

The accumulated totals are combined to generate a string having an entropy component; that is, the string will be a multi-bit value where n-bit subblocks of the string, such as groups of 8 bits, etc., will tend to exhibit some amount of variation (e.g., jitter) over the length of the string. The accumulated totals may simply be concatenated to generate the string, or more complex combinations may be used to form the string. Depending upon the configuration of the system, each string may constitute several hundreds, or several thousands or more, of the accumulated totals from the buffer 186 which are combined into a single multi-bit string.

The strings are forwarded to an extractor module 188 which applies a selected extraction function thereto to generate random numbers that are nominally indistinguishable from true random numbers. The random numbers generated by the extraction module 188 may be significantly smaller in terms of overall bits as compared to the length of the string. In one example, random numbers of nominally Y bits in length (such as Y=128 bits) are generated responsive to strings of X bits in length where X>Y (such as X=4096 bits, etc.). Other suitable ratios can be employed.

The random numbers can thereafter be stored in a memory 190 and/or forwarded to a cryptography module 192 which uses the random numbers in any number of useful ways to generate encryption keys, seed values or other random sequences. These various outputs of the cryptography module 192 can thereafter be used in a data security or security protocol as desired.

Figure 9:
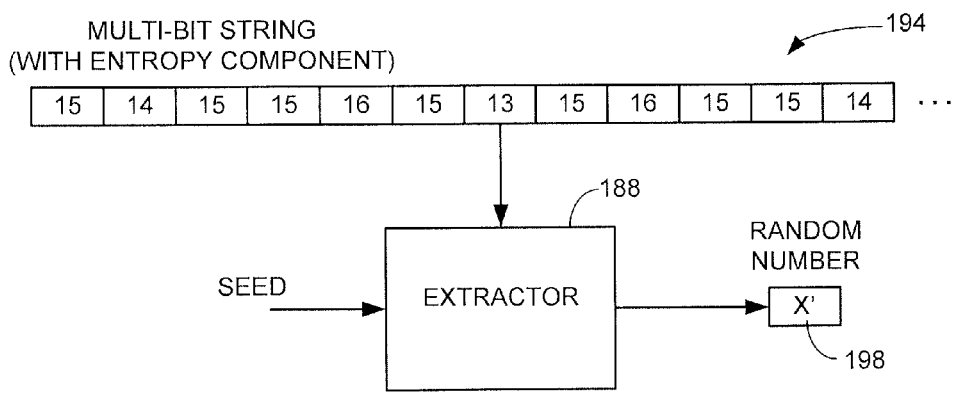
FIG. 9 is a flow diagram illustrating the generation of random numbers in accordance with FIG. 8.

FIG. 9 shows the operation of aspects of the random number generator circuit 180 of FIG. 8 in some embodiments. A string 194 is formed by concatenating a sequence of write pulse counts from FIG. 6 (shown in base 10 format for ease of illustration). The string 194 is made up of a significant number of N=15 values (based on the example discussed above in FIG. 6), although other values for N (e.g., N=13, 14, 16, etc.) are also shown and will occur within the sequence in relation to the level of entropy in the programming operation. It is contemplated that at least a minimum level of entropy will be present in the string.

The string 194 is supplied to the extractor module 188 which applies an extraction function to the input string. The function can take any number of suitable forms depending on the requirements of a given application, and may use one or more input seed values as part of the transformation process. The extraction function generates a corresponding random number 198.

In some cases, the extraction function is characterized as a universal hash function. In other cases, the extraction function is characterized as a cipher-based message authentication code (CMAC). CMAC based extraction functions are described including by the U.S. National Institute of Standards and Technology Publications 800-38B and 800-90B. The particular extraction function (or functions) used by the block 188 can be extended to any number of suitable functions depending on the requirements of a given application.

The extractor can be configured as a randomized extractor or a source specific extractor. A randomized extractor is operative on substantially any low entropy input satisfying some minimum entropy (min-entropy) lower bound. A source specific extractor is tailored to the source distribution and involves estimating (or empirical analysis of) the level of entropy in the system, and configuring the extractor function accordingly.

It is contemplated that, over time due to aging and other effects, the amount of entropy in the programming operation will tend to increase. This is an advantageous feature of the system in that greater levels of entropy in the input values will tend to enhance the randomness of the output values over time.

With reference again to FIG. 9, it will be noted that most of the accumulated counts in the string 194 are depicted as the (base 10) value 15 (e.g., 00001111 in base 2). However, by taking a sufficiently large number of the accumulated counts and concatenating these together, the system can guarantee that the entropy input to the extractor satisfies some lower min-entropy bound. This will assure that the output of the extractor is indistinguishable from true random.

Figure 10:
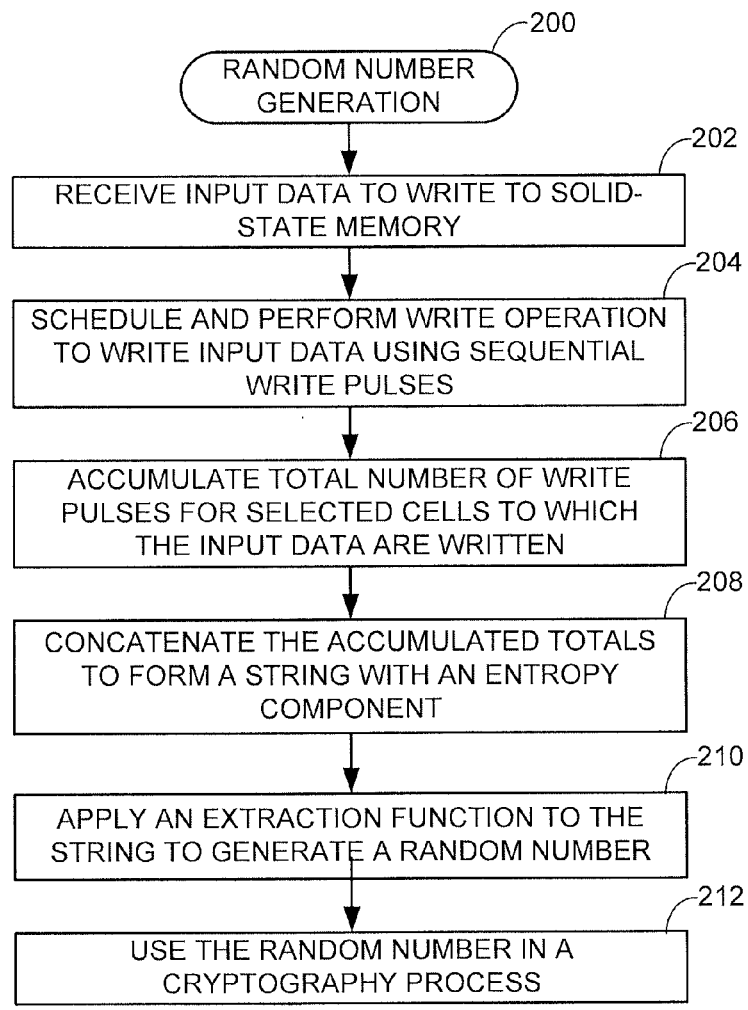
FIG. 10 is a flow chart for a random number generation routine illustrative of steps carried out in accordance with some embodiments.

FIG. 10 is a flow chart for a random number generation routine 200 illustrative of steps carried out in accordance with the foregoing discussion. It is contemplated that the various steps are carried out under the direction of a controller (such as the controller 102 in FIG. 1) during normal operation of a data storage device (such as the device 100). The various steps can be modified as required.

Input data to be written to memory are received by the device at step 202. After suitable encoding (encryption, error detection and correction, etc.), at step 204 a write operation is scheduled and the encoded write data are written to a block of non-volatile solid-state memory cells (such as the flash cells 110) using sequential write pulses to write the individual bits of the input data.

A random number generator circuit (such as 180 in FIG. 8) accumulates programming pulse parameters at step 206 during the programming operation of step 204. As shown in FIG. 10, the programming pulse parameters are total programming (write) pulses applied to each of the memory cells. Other parameters associated with the programming pulses can be used, such as elapsed time, number of program verify operations to confirm the programmed state, etc.

In other embodiments, multiple parameters can be combined to form a final parameter, such as a combination of the elapsed time and the total number of pulses. In still further embodiments, additional values in the system such as the existing P/E count, temperature reading, etc. can be combined into the final parameter. The accumulated totals can be applied to every cell written during step 204, or from selected cells 206 such as for particular programming states.

In further embodiments, programming algorithms used to program the various cells can be configured to include successive increasing/decreasing energy levels (e.g., voltage, current, etc.) to achieve the desired programming state based on feedback. Such variations could be a further source of randomness. Other factors associated with the operation of the device, such as disturb effects, can further affect the programming algorithm. In these and other cases, the programming algorithm can have a predictable portion and a non-predictable portion, and the non-predictable portion could be separately captured and used as part of the random number generation process.

The accumulated totals are concatenated (or otherwise combined) at step 208 to form a string having at least a minimum level of entropy (e.g., an entropy component). An extraction function is applied to the string at step 210 to generate a random number, and the random number is used at step 212 by a suitable cryptography purpose.

Figure 11:
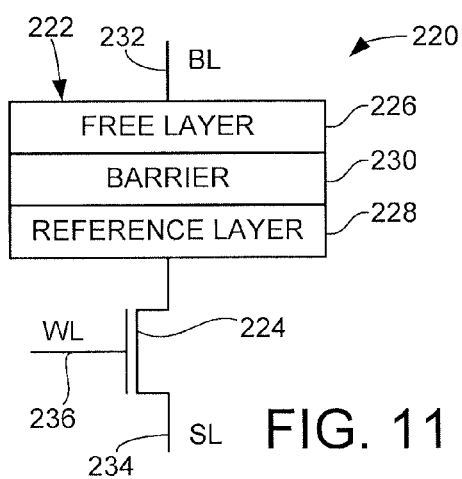
FIG. 11 shows an example construction for a spin-torque transfer random access memory (STRAM) cell from which random numbers can be generated during pulsed programming operations in accordance with further embodiments.

While the foregoing embodiments have used the programming of flash memory cells 110 to generate random numbers, other forms of non-volatile solid-state memory cells can be used. For example, FIG. 11 depicts a spin-torque transfer random access memory (STRAM) cell 220. The STRAM cell 220 includes a magnetic tunneling junction (MTJ) 222 in series with a MOSFET switching device 224.

The MTJ 222 includes a free layer 226 of magnetic material having a variable magnetic orientation, a reference layer 228 of magnetic material having a fixed (pinned) magnetic orientation, and an intervening tunnel barrier layer 230. The cell 220 is programmed to a selected electrical resistance based on the orientation of the free layer 226 relative to the reference layer 228. A relatively low resistance state is achieved in a parallel configuration (both free and reference layers oriented in the same direction) and a relatively high resistance state is achieved in an antiparallel orientation (free layer opposite the reference layer).

The cell 220 is accessed via respective bit line (BL) 232, source line (SL) 234 and word line (WL) 236 conductive paths. To program the cell, a succession of pulsed write current pulses can be applied in a selected direction between the BL 232 and the SL 234. In some cases, the number of required pulses to achieve the final desired state of the free layer can be accumulated and used as described above.

Other respective numbers of free layers, reference layers and/or barrier layers can be incorporated into the MTJ 222 as desired.

Figure 12:
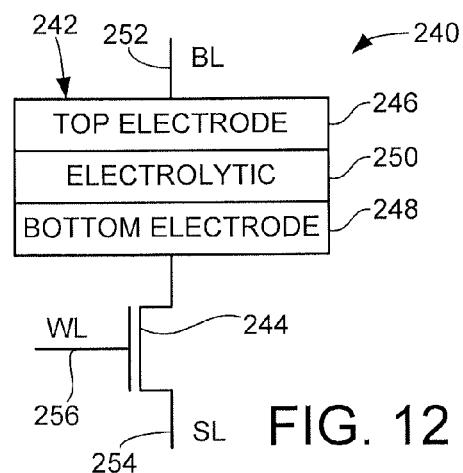
FIG. 12 shows an example construction for a spin-torque transfer random access memory (STRAM) cell from which random numbers can be generated during pulsed programming operations in accordance with further embodiments.

FIG. 12 depicts a resistive random access memory (RRAM) cell 240. The RRAM cell 240 includes a resistive sense element (RSE) 242 in series with a MOSFET switching device 244. The RSE 242 includes top and bottom conductive electrodes 246, 248 separated by an intervening electrolytic (or other ionic) layer 250. The cell 240 is accessed by respective bit, source and word lines 252, 254, 256.

As before, the RRAM cell 240 can be programmed to different electrical resistances in relation to ionic interaction between the electrodes and the electrolytic layers. Some RRAM devices form conductive filaments into and/or through the electrolytic layer, although such is merely illustrative and not necessarily required, as other RRAM device constructions utilize ion/hole migrations to alter the electrical resistance of the cell. By pulsing write currents through the RRAM cell in a desired direction (e.g., from BL to SL or vice versa), different resistive states can be programmed. As before, the total number of required pulses can be accumulated and used to generate random numbers as discussed above. It will be appreciated that any number of other forms of memory cells that utilize pulsed programming can be adapted in the generation of random numbers.

It is to be understood that even though numerous characteristics and advantages of various embodiments of the present disclosure have been set forth in the foregoing description, this description is illustrative only, and changes may be made in detail, especially in matters of structure and arrangements of parts within the principles of the present disclosure to the full extent indicated by the broad general meaning of the terms wherein the appended claims are expressed.

What is claimed is:

1. An apparatus comprising:
   a programming circuit which applies a total number of programming pulses to a solid-state memory cell which transitions the memory cell from a first programming state to a second programming state, wherein the total number of programming pulses is an integer greater than one, and
   a random number generator circuit comprising a counter which accumulates a programming pulse parameter based on the total number of programming pulses and a buffer which stores the programming pulse parameter, wherein the random number generator circuit generates a random number based on the programming pulse parameter.

2. The apparatus of claim 1, wherein the programming pulse parameter is the total number of programming pulses, and wherein the counter accumulates a total number of programming pulses for each of a plurality of solid-state memory cells and stores the accumulated total numbers in the buffer.

3. The apparatus of claim 2, wherein the random number generator circuit combines the accumulated total numbers from the buffer into a multi-bit string having an entropy component, and applies an extraction function to the string to generate the random number.

4. The apparatus of claim 1, wherein the solid-state memory cell is a flash memory cell.

5. The apparatus of claim 4, wherein the first and second programming states are multi-level cell (MLC) programming states each represented by a plurality of bits.

6. The apparatus of claim 4, wherein the first programming state is an erased state and the second programming state is a single-level cell (SLC) programming state represented by only a single bit.

7. The apparatus of claim 1, wherein the solid-state memory cell comprises a spin-torque transfer random access memory (STRAM) cell and the total number of programming pulses comprises a total number of current pulses required to transition a free layer of the STRAM cell to a selected magnetic orientation relative to a reference layer.

8. The apparatus of claim 1, wherein the solid-state memory cell comprises a resistive random access memory (RRAM) cell, the total number of programming pulses comprises an accumulated count of current pulses required to transition a resistive sense element (RSE) of the RRAM cell to a selected programmed electrical resistance, and wherein the random number is generated based on the accumulated count.

9. The apparatus of claim 1, wherein the programming pulse parameter is the total number of programming pulses, and wherein the random number generator circuit comprises an extractor which applies an extraction function to a multi-bit string generated by concatenating a plurality of total numbers of programming pulses from a population of memory cells.

10. The apparatus of claim 1, wherein the solid-state memory cell forms a portion of a non-volatile memory, and wherein the apparatus further comprises a cryptographic module which uses the generated random number to encrypt data subsequently stored in the memory.

11. The apparatus of claim 1, wherein the programming pulse parameter is the total number of programming pulses, and wherein the counter counts the total number of programming pulses to generate a total count value which is stored in the buffer.

12. The apparatus of claim 1, further comprising a timer which identifies an elapsed time interval required to apply the total number of programming pulses, wherein the programming pulse parameter is the elapsed time interval, and wherein the random number generator circuit uses the elapsed time interval to generate the random number.

13. An apparatus comprising:
   a solid-state memory comprising a plurality of non-volatile memory cells;
   a programming circuit configured to transition the memory cells from a first programmed state to a different, second programmed state through the application of a plurality of successive programming pulses;
   a counter circuit which accumulates a programming pulse parameter based on a total number of the successive program pulses applied by the programming circuit to program a selected memory cell; and
   an extractor which generates a random number using the programming pulse parameter.

14. The apparatus of claim 13, wherein the programming pulse parameter is the total number of the successive program pulses.

15. The apparatus of claim 13, wherein the programming pulse parameter is an elapsed time interval over which the total number of the successive program pulses are applied.

16. The apparatus of claim 13, further comprising a controller which concatenates a plurality of the programming pulse parameters associated with the programming of a corresponding plurality of the memory cells from the memory to form a multi-bit string having an entropy component, and wherein the extractor module applies an extraction function to the string to generate the random number.

17. The apparatus of claim 13, wherein the solid-state memory is characterized as a flash memory and the plurality of non-volatile memory cells are each characterized as a flash memory cell having a floating gate, and wherein the programming circuit uses a charge pump to successively transfer accumulated charge to the floating gate of a selected flash memory cell in a series of programming pulses to program the selected flash memory cell to a final charge state.

18. A method comprising:
- writing, by a programming circuit, input data to a group of non-volatile solid-state memory cells by applying respective numbers of programming pulses thereto;
- accumulating, in a buffer, a total count of the programming pulses for each of at least a portion of the cells in said group, each accumulated total count being an integer greater than one;
- combining, by a random number generator circuit, the accumulated total counts of the programming pulses to form a multi-bit string having an entropy component; and
- applying, by the random number generator circuit, an extraction function to the string to form a random number.

19. The method of claim 18, wherein the extraction function is a randomized extractor function.

20. The method of claim 18, wherein the extraction function is a source specific extractor function.

\* \* \* \* \*